2,969,367
PROCESS OF ISOMERIZING YOHIMBANE COMPOUNDS

Maurice-Marie Janot, Robert Goutarel, and Alain Le Hir, Paris, France, assignors to Les Laboratoires Gobey, Paris, France, a firm of France
No Drawing. Filed Feb. 19, 1959, Ser. No. 794,227
Claims priority, application France Feb. 26, 1958
2 Claims. (Cl. 260—287)

The present invention relates to a process of isomerizing yohimbane compounds of the general Formula I:

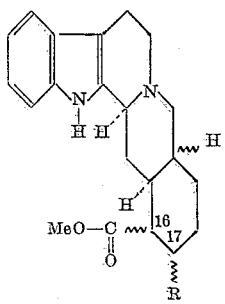

wherein R represents a secondary alcohol group

or a keto group =O.

It is one object of the present invention to provide a simple and effective process for isomerizing such compounds of the general Formula I, thus accomplishing selective orientation of the substituents at the carbon atom 16 and the carbon atom 17.

Other objects of the present invention and advantageous features thereof will become apparent as the description proceeds.

In principle, the present invention consists in subjecting a yohimbine compound of the general Formula I, either in the pure state or in the state in which it is obtained in the course of synthetic processes, to the action of an alkali metal alcoholate of a tertiary alcohol, such as potassium tertiary butanolate or potassium tertiary amyl alcoholate in an inert solvent, such as benzene or toluene. Starting materials corresponding to general Formula I are, for instance, yohimbine and allo-yohimbine which are thus converted, respectively, into β-yohimbine and α-yohimbine. The new isomerization process according to the present invention can be carried out simultaneously with other operations, for instance, with oxidation. Thus, corynanthine is subjected to the action of potassium tertiary butanolate and 9-fluorenone and yields thereby, due to oxidation, yohimbinone.

The following examples serve to illustrate the present invention, without, however, limiting the same thereto. More particularly, many changes and variations in the solvents used, in the reaction conditions, temperatures, and duration, in the order of introducing the reagents may be made by those skilled in the art in accordance with the principles set forth herein and in the claims annexed hereto.

The reaction may take place at atmospheric pressure or under pressure, on contact with the atmosphere or in a nitrogen atmosphere. The melting points given in the examples are instantaneous melting points, determined on the Maquenne block.

The formula sheet given at the end of the specification illustrates the structural formulas of the compounds used as starting materials in the examples and obtained therefrom.

EXAMPLE 1

*Isomerization of yohimbine of Formula II to β-yohimbine of Formula III*

2 g. of yohimbine in 50 cc. of benzene are added to 2 g. of potassium tertiary butanolate. The resulting mixture is refluxed in a nitrogen atmosphere for one hour. After cooling, 400 cc. of ether are added. The mixture is washed with water until neutral and the ether layer is separated from the aqueous layer.

(a) *Treatment of the ether solution.*—The solution, which contains β-yohimbine, is dried over sodium sulfate and distilled to dryness. The residue, recrystallized from methanol, yields, after filtering off the crystals and drying, 945 mg. of crude β-yohimbine.

(b) *Treatment of the aqueous solution.*—The aqueous solution containing β-yohimbic acid is acidified with hydrochloric acid and then distilled to dryness in a vacuum. The residue is dissolved in 50 cc. of methanol and the solution is saturated with gaseous hydrochloric acid and refluxed for 3 hours. Methanol is distilled off in a vacuum and the residue is dissolved in 150 cc. of water. Ammonia is added to the solution, which is then extracted with ether. The extracts, after washing with water and drying over sodium sulfate, yields 350 mg. of crude β-yohimbine, which increases the total yield of pure β-yohimbine obtained according to the present invention to about 50%. The melting point of β-yohimbine is 236° C.

EXAMPLE 2

*Isomerization of allo-yohimbine of Formula IV to α-yohimbine of Formula V*

2 g. of allo-yohimbine are isomerized by means of potassium tertiary butanolate in benzene by following the procedure described in Example 1. 1.420 g. of a crude α-yohimbine are obtained. The total yield of pure compound, the melting point of which is 235° C., is about 55%.

EXAMPLE 3

*Preparation of yohimbinone of Formula VII from corynanthine of Formula VI*

2 g. of corynanthine are mixed with 2 g. of anhydrous potassium tertiary butanolate, 3.5 g. of 9-fluorenone, and 50 cc. of anhydrous benzene. The mixture is refluxed in a nitrogen atmosphere for one hour with stirring. After cooling, 30 cc. of ethyl acetate and 30 cc. of water are added to the reaction mixture. After stirring, the organic layer is separated by decanting and the aqueous layer is extracted with ethyl acetate. The organic layer and the extracts are combined, washed with water, and extracted with a 5% aqueous solution of acetic acid. The acetic acid extracts are washed with ether and sodium carbonate is then added thereto to set free the base which is extracted with chloroform, dried, filtered, and distilled to dryness in a vacuum. The residue, recrystallized from a mixture of chloroform-methanol (1:1), yields 1.07 g. (53%) of yohimbinone of the melting point 243–249° C.

In place of the potassium tertiary butanolate used as isomerizing agent in the preceding examples, there may be employed other alkali metal tertiary alcoholates, such as sodium tertiary butanolate, sodium or potassium amyl alcoholate.

In place of benzene used as inert organic solvent in the examples, there may be employed other aromatic hydrocarbons, such as toluene, xylene, or other solvents.

The compounds obtained by the isomerization process according to the present invention are either important intermediates for the preparation of valuable pharmaceutical compounds or they possess interesting physiological properties which render them useful as therapeutic agents,

EXAMPLE 1

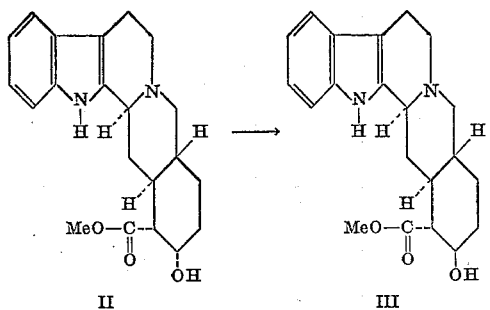

II    III

EXAMPLE 2

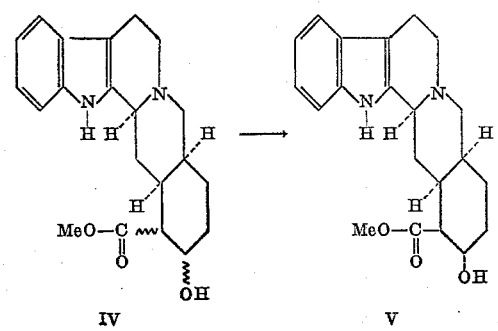

IV    V

EXAMPLE 3

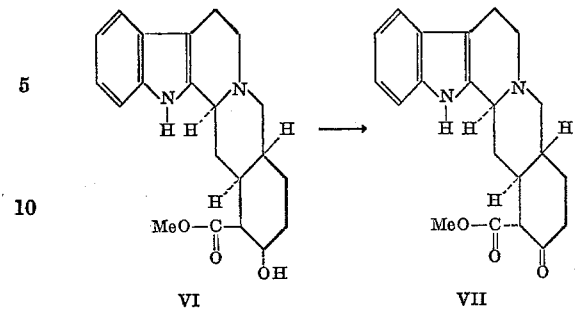

VI    VII

We claim:
1. In the process of isomerizing yohimbine to β-yohimbine, the steps which comprise adding potassium tertiary butanolate to a solution of yohimbine in benzene, heating the mixture under reflux, and isolating the resulting β-yohimbine.
2. In a process of isomerizing allo-yohimbine to α-yohimbine, the steps which comprise adding potassium tertiary butanolate to a solution of allo-yohimbine in benzene, heating the mixture under reflux and isolating the resulting α-yohimbine.

References Cited in the file of this patent
Le Hir: Compte Rend, vol. 246, pp. 1564–6 (1958).